(12) United States Patent
Tabei (10) Patent No.: US 10,250,790 B2
(45) Date of Patent: Apr. 2, 2019

(54) ELECTRIC APPARATUS, IMAGE PROJECTION APPARATUS AND IMAGE CAPTURING APPARATUS

(71) Applicant: CANON KABUSHIKI KAISHA, Tokyo (JP)

(72) Inventor: Kunihiko Tabei, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 844 days.

(21) Appl. No.: 14/618,153

(22) Filed: Feb. 10, 2015

(65) Prior Publication Data

US 2015/0229872 A1 Aug. 13, 2015

(30) Foreign Application Priority Data

Feb. 12, 2014 (JP) ................................. 2014-024473
Jan. 26, 2015 (JP) ................................. 2015-012264

(51) Int. Cl.
*H04N 9/04* (2006.01)
*H04N 9/09* (2006.01)
(Continued)

(52) U.S. Cl.
CPC ......... *H04N 5/2258* (2013.01); *H04N 5/3577* (2013.01); *H04N 9/045* (2013.01);
(Continued)

(58) Field of Classification Search
CPC .... H04N 5/2258; H04N 5/3577; H04N 9/045; H04N 9/09; H04N 9/3105; H04N 9/3167; G09G 3/3614
(Continued)

(56) References Cited

U.S. PATENT DOCUMENTS

| 5,229,848 A | 7/1993 | Sugasawa |
| 5,626,409 A | 5/1997 | Nakayama et al. |

(Continued)

FOREIGN PATENT DOCUMENTS

| JP | 1320890 A | 12/1989 |
| JP | H03145285 A | 6/1991 |

(Continued)

OTHER PUBLICATIONS

Office Action issued in Japanese Appln. No. 2015-012264 dated Feb. 9, 2016. English translation provided.

*Primary Examiner* — Collin X Beatty
(74) *Attorney, Agent, or Firm* — Rossi, Kimms & McDowell LLP (57) ABSTRACT

The electric apparatus includes first and second electrically driven elements operating in response to receipt of electric signals whose polarities reverse periodically at mutually same periods, and a signal outputter outputting the electric signals respectively to the first and second electrically driven elements. The first and second electrically driven elements are arranged such that each of their element surfaces faces toward the element surface of the other electrically driven element or such that their element surfaces face toward a same plane from mutually opposite sides across the plane. The signal outputter outputs the electric signals such that, in each period of the electric signals, a time period in which their polarities are mutually opposite is longer than a time period in which their polarities are mutually identical.

7 Claims, 7 Drawing Sheets

(51) Int. Cl.
*H04N 9/31* (2006.01)
*H04N 5/225* (2006.01)
*H04N 5/357* (2011.01)

(52) U.S. Cl.
CPC ............ *H04N 9/09* (2013.01); *H04N 9/3105* (2013.01); *H04N 9/3167* (2013.01)

(58) Field of Classification Search
USPC ........................................................ 359/246
See application file for complete search history.

(56) References Cited

U.S. PATENT DOCUMENTS

| | | | |
|---|---|---|---|
| 6,928,136 B2* | 8/2005 | Nagao .................. | G09G 3/3648 326/119 |
| 2002/0011984 A1* | 1/2002 | Shirochi .............. | H04N 9/3105 345/96 |
| 2008/0007662 A1* | 1/2008 | Toyooka .............. | G09G 3/3406 349/8 |
| 2014/0168391 A1* | 6/2014 | Terashima ......... | H04N 13/0438 348/56 |

FOREIGN PATENT DOCUMENTS

| | | |
|---|---|---|
| JP | H04229761 A | 8/1992 |
| JP | 540250 A | 2/1993 |
| JP | 5292518 A | 11/1993 |
| JP | 2001209121 A | 8/2001 |
| JP | 2007233217 A | 9/2007 |
| JP | 2007-334416 A | 12/2007 |
| JP | 2008015407 A | 1/2008 |
| JP | 2011-152744 A | 8/2011 |

* cited by examiner

ELECTRIC APPARATUS, IMAGE PROJECTION APPARATUS AND IMAGE CAPTURING APPARATUS

BACKGROUND OF THE INVENTION

Field of the Invention

The present invention relates to an electric apparatus including an electrically driven element configured to operate in response to receipt of a periodic signal, such as image projection apparatus and an image capturing apparatus.

Description of the Related Art

Image projection apparatuses often includes, in order to project a color image, three optical modulators (electrically driven elements) such as liquid crystal panels respectively modulating a red light, a blue light and a green light according to an input image signal. Moreover, some image capturing apparatuses such as a video camera are provided with three image sensors (electrically driven elements) respectively performing image capturing by photoelectrically converting optical images (object images) formed by a red light, a blue light and a green light, in order to record a color image. In such image projection and image capturing apparatuses, the three optical modulators and the three image sensors are often arranged around an optical element such as a prism efficiently introducing the red, blue and green lights to them; two of them are arranged such that their element surfaces (light entrance surfaces or image capturing surfaces) are mutually parallel and face toward the optical element.

The three optical modulators and the three image sensors are configured to operate mutually synchronously on a basis of a common synchronization signal. For this reason, the optical modulators and the image sensors whose element surfaces are mutually parallel each emit extraneous emission (EMI radiation) toward the other element surface, which results in a superposed extraneous emission whose intensity is high.

Japanese Patent Laid-Open No. 2011-152744 discloses a method of reducing the extraneous emission, in laser beam printers or laser copiers, by delaying a lighting timing of one of multiple laser diodes, which are originally to be lighted simultaneously, with respect to that of another of the laser diodes. Furthermore, Japanese Patent Laid-Open No. 2007-334416 discloses a method of reducing the extraneous emission, in laser beam printers or laser copiers, by intentionally dispersing phases of clock signals provided to multiple image processors and thereby mutually shifting phases of waveforms of electric currents consumed by operations of the image processors.

However, Japanese Patent Laid-Open Nos. 2011-152744 and 2007-334416 fail to disclose a measure to applicable to a case where, like the above-mentioned image projection and image capturing apparatuses, the extraneous emission is emitted from each of the electrically driven elements arranged mutually parallel toward the element surface of the other electrically driven element.

SUMMARY OF THE INVENTION

The present invention provides an electric apparatus capable of preventing generation of a superposed extraneous emission between electrically driven elements arranged in a specific arrangement relation and of mutually canceling out the extraneous emissions from these elements.

The present invention provides as an aspect thereof an electric apparatus including a first electrically driven element configured to operate in response to receipt of a first electric signal whose polarity reverses periodically, a second electrically driven element configured to operate in response to receipt of a second electric signal whose polarity reverses periodically at a same period as that of the first electric signal, and a signal outputter configured to output the first and second electric signals respectively to the first and second electrically driven elements. The first and second electrically driven elements are arranged such that each of their element surfaces faces toward the element surface of the other electrically driven element or such that their element surfaces face toward a same plane from mutually opposite sides across the plane, and the signal outputter is configured to output the first and second electric signals such that, in each period of the first and second electric signals, a time period in which their polarities are mutually opposite is longer than a time period in which their polarities are mutually identical.

The present invention provides as another aspect thereof an image projection apparatus including a first optical modulator configured to operate in response to receipt of a first electric signal whose polarity reverses periodically so as to modulate a first color light introduced thereto, a second optical modulator configured to operate in response to receipt of a second electric signal whose polarity reverses periodically at a same period as that of the first electric signal so as to modulate a second color light introduced thereto, a third optical modulator configured to operate in response to receipt of a third electric signal whose polarity reverses periodically at a same period as those of the first and second electric signals so as to modulate a third color light introduced thereto, an optical element through which exit lights from the first, second and third optical modulators pass, a projection optical system configured to project an image light including the exit lights modulated by the first, second and third optical modulators onto a projection surface, and a signal outputter configured to output the first, second and third electric signals respectively to the first, second and third optical modulators. The first and second optical modulators are arranged on mutually opposite sides across the optical element. Light exit surfaces of the first and second optical modulators respectively face first and second light entrance surfaces provided in the optical element at mutually opposite sides thereof, and a light exit surface of the third optical modulator faces a third light entrance surface provided in the optical element, the third light entrance surface facing toward a different direction from the first and second light entrance surfaces. The signal outputter is configured to output the first and second electric signals such that, in each period of the first and second electric signals, a time period in which their polarities are mutually reversed is longer than a time period in which their polarities are mutually identical.

The present invention provides as still another aspect thereof an image capturing apparatus including a first image sensor configured to operate in response to receipt of a first electric signal whose polarity reverses periodically so as to capture an optical image formed by a first color light, a second image sensor configured to operate in response to receipt of a second electric signal whose polarity reverses periodically at a same period as that of the first electric signal so as to capture an optical image formed by a second color light, a third image sensor configured to operate in response to receipt of a third electric signal whose polarity reverses periodically at a same period as those of the first and second electric signals so as to capture an optical image formed by a third color light, an optical element configured to introduce the first, second and third lights respectively to the first, second and third image sensors, and a signal outputter configured to output the first, second and third electric signals respectively to the first, second and third image sensors. The first and second image sensors are arranged on mutually opposite sides across the optical element, image capturing surfaces of the first and second image sensors respectively face first and second light exit surfaces provided in the optical element at mutually opposite sides thereof, and an image capturing surface of the third image sensor faces a third light exit surface provided in the optical element, the third light exit surface facing toward a different direction from the first and second light exit surfaces. The signal outputter is configured to output the first and second electric signals such that, in each period of the first and second electric signals, a time period in which their polarities are mutually reversed is longer than a time period in which their polarities are mutually identical.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Embodiment 1

Figure 1:
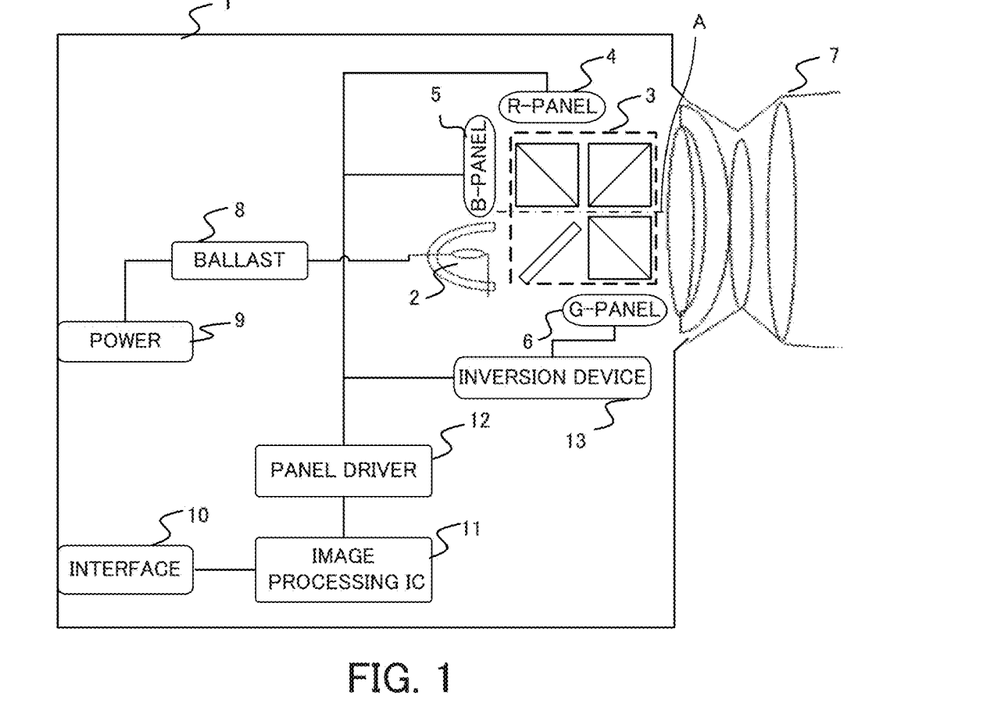
FIG. 1 is a block diagram showing a configuration of an image projection apparatus that is Embodiment 1 of the present invention.

FIG. 1 shows a configuration of an image projection apparatus 1 as an electric apparatus that is a first embodiment (Embodiment 1) of the present invention.

First, description of an optical configuration of the image projection apparatus 1 will be made. Reference numeral 2 denotes a lamp (light source) constituted by an electric discharge arc tube such as a high-pressure mercury lamp. The lamp 2 emits a white light toward a prism unit 3. The light source may be a semiconductor light emitting element such as an LED and a laser diode, instead of the lamp 2.

The prism unit 3 is an optical element that separates the white light from the lamp 2 into a red light (first color light), a green light (second colored light) and a blue light (third color light) and introduces these color lights respectively toward a first optical modulator 4, a second optical modulator 6 and a third optical modulator 5. The color lights exiting from the first to third optical modulators 4, 6 and 5 also enters the prism unit 3. As the optical modulator, various electrically driven elements may be used which are capable of modulating an entering light to produce an image light (exit light) such as a reflective liquid crystal panel and a digital micromirror device. The first optical modulator 4, the second optical modulator 6 and the third optical modulator 5 respectively correspond to a first electrically driven element, a second electrically driven element and a third electrically driven element. In the following description, the first optical modulator 4, the second optical modulator 6 and the third optical modulator 5 are respectively referred to as "a red panel 4", "a green panel 6" and "a blue panel 5".

The three color lights modulated by the red, green and blue panels 4, 6 and 5 enter the prism unit 3 again and then enters a projection optical system 7 to be projected onto a projection surface (not shown) such as a screen. Thereby, a full color projected image is displayed.

Next, description of an electrical configuration of the image projection apparatus 1 will be made. Reference numeral 9 denotes a power input portion for an external AC power supply. Reference numeral 8 denotes a power supply ballast that produces a high voltage from the external AC power supply for causing the lamp 2 to emit the light.

Reference numeral 10 denotes an image input interface that takes in an image signal (input image signal) from outside the image projection apparatus 1. Various image signals are input to the image input interface 10 from image supply apparatuses (not shown) such as a DVD player and a personal computer.

Reference numeral 11 denotes an image processing IC that performs various processes on the input image signal to convert the input image signal into video data signals for red, green and blue respectively suitable for drive of the red, green and blue panels 4, 6 and 5. The video data signals from the image processing IC 11 are sent to a panel driver 12. The panel driver 12 outputs drive signals corresponding respectively to the video data signals for red, green and blue and outputs synchronization signals for causing the red, green and blue panels 4, 6 and 5 to synchronously (or approximately synchronously) operate. The synchronization signals output (supplied) to the red panel 4, the green panel 6 and the blue panel 5 correspond respectively to a first electric signal, a second electric signal and a third electric signal whose polarities reverse periodically at mutually same periods.

The synchronization signal to the green panel 6 is input to an inversion device 13. The inversion device 13 reverses the polarity of the synchronization signal and supplies it to the green panel 6. Thereby, the polarity of the synchronization signal supplied to the green panel 6 becomes opposite to the polarities of the synchronization signals output to the red and blue panels 4 and 5. The polarities of the synchronization signals supplied to the red and blue panels 4 and 5 are mutually identical. The panel driver 12 and the inversion device 13 constitute a signal outputter.

Although this embodiment shows the case where the inversion device 13 is separate from the panel driver 12, the inversion device 13 may be included in the panel driver 12.

Each of the red, green and blue panels 4, 6 and 5 receiving the video data signals and the synchronization signals performs, in synchronization with the synchronization signal, a modulation operation to modulate the entering light and thereby produce the image light corresponding to the video data signal.

A setting may be made such that the red and blue panels 4 and 5 each take in the image signal at rising edges of the synchronization signal and the green panel 6 takes in the image signal at falling edges of the synchronization signal. Thereby, even when the polarities of the synchronization signals are mutually reversed, timings at which the red, green and blue panels 4, 6 and 5 take in the video data signals can be approximately synchronized.

Figure 2:
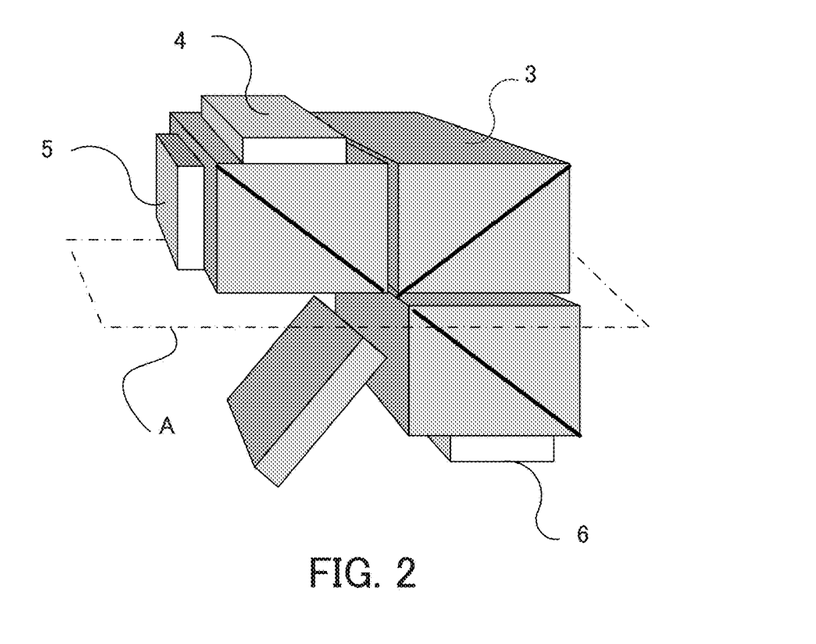
FIG. 2 shows arrangement of liquid crystal panels in the image projection apparatus of Embodiment 1.

FIG. 2 shows arrangement of the red, green and blue panels 4, 5 and 6 around the prism unit 3 shown in FIG. 1. The red and green panels 4 and 6 are arranged on mutually opposite side across the prism unit 3. Light exit surfaces (element surfaces) of the red and green panels 4 and 6 respectively face two light entrance surfaces (first and second entrance surfaces) provided at mutually opposite sides in the prism unit 3. This arrangement condition is hereinafter referred to as "arrangement condition 1".

Furthermore, the red and green panels 4 and 6 are arranged such that each of their light exit surfaces faces toward the light exit surface of the other panel. This arrangement condition is hereinafter referred to as "arrangement condition 2". Moreover, the red and green panels 4 and 6 are arranged such that their light exit surfaces face toward a same plane A (also shown in FIG. 1) from mutually opposite sides across the plane A. This arrangement condition is hereinafter referred to as "arrangement condition 3". This embodiment shows, as a representative example satisfying these arrangement conditions 1 to 3, a case where the red and green panels 4 and 6 are arranged mutually parallel (that is, parallel to the plane A) and their light exit surfaces face toward directions facing (opposite to) each other, that is, each face toward a direction facing the plane A.

On the other hand, the blue panel 5 is arranged such that its light exit surface faces a light entrance surface (third entrance surface) of the prism unit 3; the third light entrance surface faces toward a different direction from the first and second light entrance surfaces of the prism unit 3. In other words, the blue panel 5 is arranged such that its light exit surface does not face toward the plane A.

The red and green panels 4 and 6 arranged as above each generate extraneous emission due to polarity change of the synchronization signal. Directions of directivity of the extraneous emissions (extraneous emission directivities) from the red and green panels 4 and 6 arranged mutually parallel are directions orthogonal to their light exit surfaces, which are directions facing each other. Therefore, if the polarities of the synchronization signals supplied to the red and green panels 4 and 6 are always mutually identical, the extraneous emissions from the red and green panels 4 and 6 are mutually superposed.

The extraneous emission is emission of electric waves, i.e., emission of waves having energy. Emitting a rising wave and a falling wave from directions facing each other enables cancelling the energies of each other out.

For this reason, this embodiment provides, as mentioned above, the inversion device 13 to mutually reverse the polarities of the synchronization signals supplied to the red and green panels 4 and 6. Thereby, the extraneous emissions from the red and green panels 4 and 6 mutually cancel out, which makes it possible to reduce an overall extraneous emission due to the operations of the red and green panels 4 and 6. In particular, in this embodiment, the red and green panels 4 and 6 are arranged mutually parallel and their light exit surfaces face toward the directions facing each other, that is, the directions of the extraneous emission directivities approximately face each other, which increases the effect of reducing the extraneous emission.

Figure 3A:
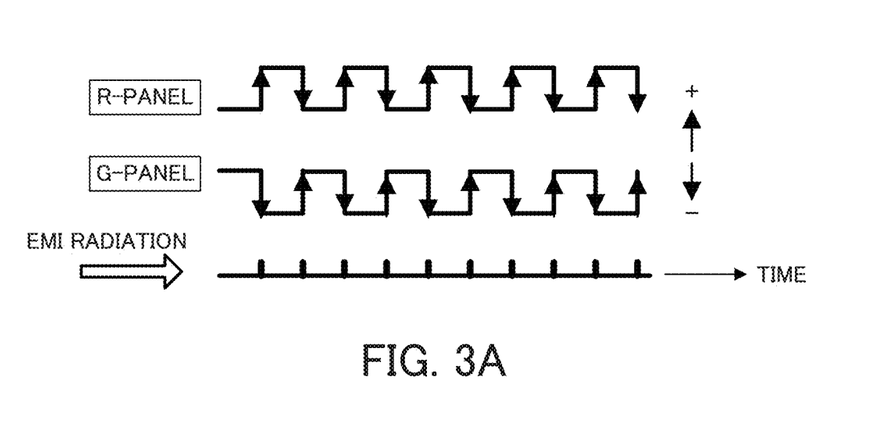
FIGS. 3A and 3B show an effect provided by Embodiment 1.
Figure 3B:
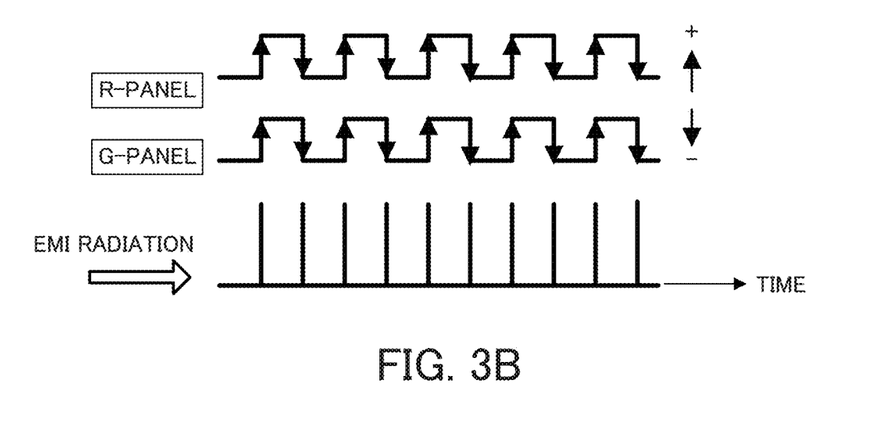

FIG. 3B shows intensity of the extraneous emission (EMI radiation) when the polarities of the synchronization signals supplied to the red and green panels 4 and 6 are mutually identical. Upper and middle parts of FIG. 3B respectively show the synchronization signals supplied to the red and green panels 4 and 6; these synchronization signals have mutually identical polarities at each time shown along a horizontal axis in the figure. A lower part of FIG. 3B shows a high intensity extraneous emission (superposed extraneous emission) caused by superposition of the extraneous emissions from the red and green panels 4 and 6.

On the other hand, FIG. 3A shows intensity of the extraneous emission when the polarities of the synchronization signals supplied to the red and green panels 4 and 6 are mutually opposite. As in FIG. 3B, upper and middle parts of FIG. 3A respectively show the synchronization signals supplied to the red and green panels 4 and 6; these synchronization signals have mutually opposite polarities at each time. A lower part of FIG. 3A shows that the extraneous emissions from the red and green panels 4 and 6 mutually cancel out, which results in a significantly lower intensity extraneous emission than the high intensity extraneous emission shown in FIG. 3B.

As described above, this embodiment supplies the synchronization signals having mutually opposite polarities to the red and green panels 4 and 6 arranged under the arrangement conditions 1 to 3 and thereby effectively reduces the extraneous emission.

This embodiment described the case where, as shown in FIG. 3A, the polarities of the synchronization signals supplied to the red and green panels 4 and 6 are always mutually opposite, that is, a case where there exists no time period in which the polarities of the synchronization signals are mutually identical. However, such a relation is not necessarily needed. Although the red and green panels 4 and 6 are basically required to synchronously operate with each other, if there is a range where gap-of-synchronization is permitted, the polarities of the synchronization signals may be mutually identical in that range. In other words, it is only necessary that, in each period of the synchronization signals supplied to the red and green panels 4 and 6, a time period in which the polarities of the synchronization signals are mutually opposite be longer than a time period in which the polarities of the synchronization signals are mutually identical.

In addition, although this embodiment described the case where the red and green panels 4 and are arranged parallel to each other, they may be arranged not parallel to each other as long as the arrangement thereof satisfies at least one of the arrangement conditions 1 to 3.

Embodiment 2

Next, description will be made of a video camera (image capturing apparatus) 30 as an electric apparatus that is a second embodiment (Embodiment 2) of the present invention with reference to FIG. 4.

First, description of an optical configuration of the video camera 30 will be made. Reference numeral 17 denotes an image capturing optical system that causes light from an object to form an optical image (object image). Reference numeral 16 denotes a prism unit as an optical element. The prism unit 16 separates the light entering through the image capturing optical system 17 into a red light (first color light), a blue light (second color light) and a green light (third color light) and introduces the red light, the blue light and the green light respectively to a first image sensor 18, a second image sensor 19 and a third image sensor 20. As the image sensor, various photoelectric conversion elements capable of converting the optical image into an electric signal, such as a CCD sensor and a CMOS sensor, can be used. The first image sensor 18, the second image sensor 19 and the third image sensor 20 respectively correspond to a first electrically driven element, a second electrically driven element and a third electrically driven element. In the following description, the first image sensor 18, the second image sensor 19 and the third image sensor 20 are respectively referred to as "a red sensor 18", "a blue sensor 19" and "a green sensor 20".

Next, description of an electric configuration of the video camera 30 will be made. Reference numeral 21 denotes a sensor driver. The sensor driver 21 outputs a vertical synchronization signal and a horizontal synchronization signal which are necessary for operations of the respective image sensors. The sensor driver 21 further outputs an image transfer synchronization signal. The vertical, horizontal and image transfer synchronization signals are hereinafter collectively referred to as "a synchronization signal". The synchronization signals output (supplied) to the red sensor 18, the blue sensor 19 and the green sensor 20 respectively correspond to a first electric signal, a second electric signal and a third electric signal whose polarities reverse periodically at mutually same periods.

The synchronization signal for the red sensor 18 output from the sensor driver 21 is input to an inversion device 22. The inversion device 22 reverses the polarity of the synchronization signal for the red sensor 18 and supplies it to the red image sensor 18. Thereby, the polarity of the synchronization signal supplied to the red sensor 18 becomes opposite to the polarities of the synchronization signals supplied to the blue and green sensors 19 and 20. The polarities of the synchronization signals supplied to the blue and green sensors 19 and 20 are mutually identical. The sensor driver 21 and the inversion device 22 constitute a signal outputter.

Although this embodiment shows the case where the inversion device 22 is separate from the sensor driver 21, the inversion device 22 may be included in the sensor driver 21.

Each of the red, blue and green sensors 18, 19 and 20 performs, in synchronization with the synchronization signal, an operation to convert the object image into an electric signal and an operation to output the converted electric signal to a video processing IC 23. The video processing IC 23 converts the electric signal from each of the sensors 18, 19 and 20 into a signal of a predetermined video format and outputs it as a video signal to outside through an interface 24, displays it on a monitor (not shown) or records it to a storage medium such as a semiconductor memory.

Figure 4:
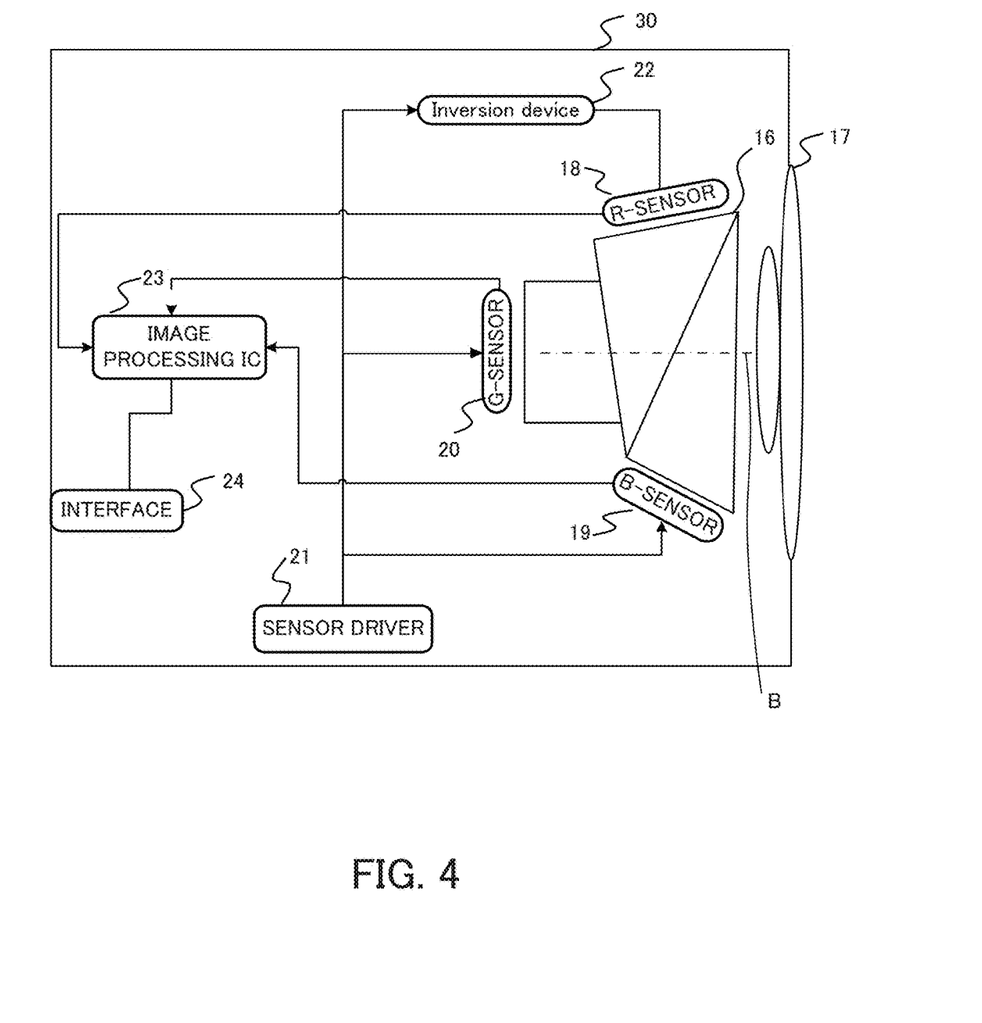
FIG. 4 is a block diagram showing a configuration of an image capturing apparatus that is Embodiment 2 of the present invention.

As shown in FIG. 4, the red and blue sensors 18 and 19 are arranged on mutually opposite side across the prism unit 16. Image capturing surfaces (element surfaces) of the red and blue sensors 18 and 19 respectively face two light exit surfaces (first and second exit surfaces) provided at mutually opposite sides in the prism unit 16. This arrangement condition is hereinafter referred to as "arrangement condition 1".

Furthermore, the red and blue sensors 18 and 19 are arranged such that each of their image capturing surfaces faces toward the image capturing surface of the other sensor. This arrangement condition is hereinafter referred to as "arrangement condition 2". Moreover, the red and blue sensors 18 and 19 are arranged such that their image capturing surfaces face toward a same plane B from mutually opposite sides across the plane B. This arrangement condition is hereinafter referred to as "arrangement condition 3". This embodiment shows, as an example satisfying these arrangement conditions 1 to 3, a case where the image capturing surface of one of the red and blue sensors 18 and 19 is tilted by approximately 40 degrees with respect to that of the other sensor. Specifically, this embodiment shows a case where the image capturing surfaces of the red and blue sensors 18 and 19 are tilted respectively by approximately 10 degrees and by approximately 30 degrees with respect to the plane B.

On the other hand, the green sensor 20 is arranged such that its image capturing surface faces a light exit surface (third exit surface) of the prism unit 16; the third light exit surface faces toward a different direction from the first and second light exit surfaces of the prism unit 16. In other words, the green sensor 20 is arranged such that its image capturing surface does not face toward the plane B. The red and blue sensors 18 and 19 arranged as above each generate extraneous emission due to polarity change of the synchronization signal. Directions of extraneous emission directivities from the red and blue sensors 18 and 19 arranged mutually approximately parallel to each other (though being mutually tilted by approximately 40 degrees) are directions orthogonal to their light exit surfaces, which are directions (approximately) facing each other. At least as compared with a relation of each of the red and blue sensors 18 and 19 and the green sensor 20 forming an angle of approximately 90 degrees, the above relation of the red and blue sensors 18 and 19 creates a state where the directions of extraneous emission directivities therefrom more nearly face each other. Therefore, if the polarities of the synchronization signals supplied to the red and blue sensors 18 and 19 are always mutually identical, the extraneous emissions from the red and blue sensors 18 and 19 are mutually superposed.

For this reason, this embodiment provides, as mentioned above, the inversion device 22 to mutually reverse the polarities of the synchronization signals supplied to the red and blue sensors 18 and 19. Thereby, the extraneous emissions from the red and blue sensors 18 and 19 mutually cancel out, which makes it possible to reduce an overall extraneous emission due to the operations of the red and blue sensors 18 and 19.

Figure 5A:
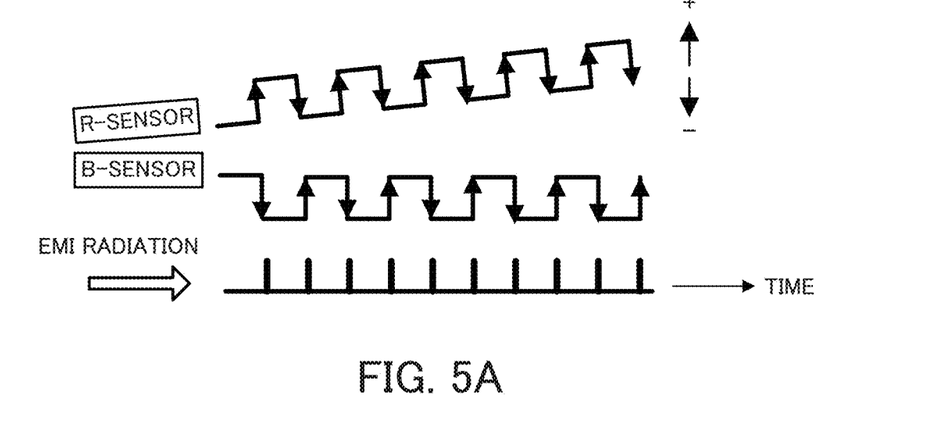
FIGS. 5A and 5B show an effect provided by Embodiment 2.
Figure 5B:
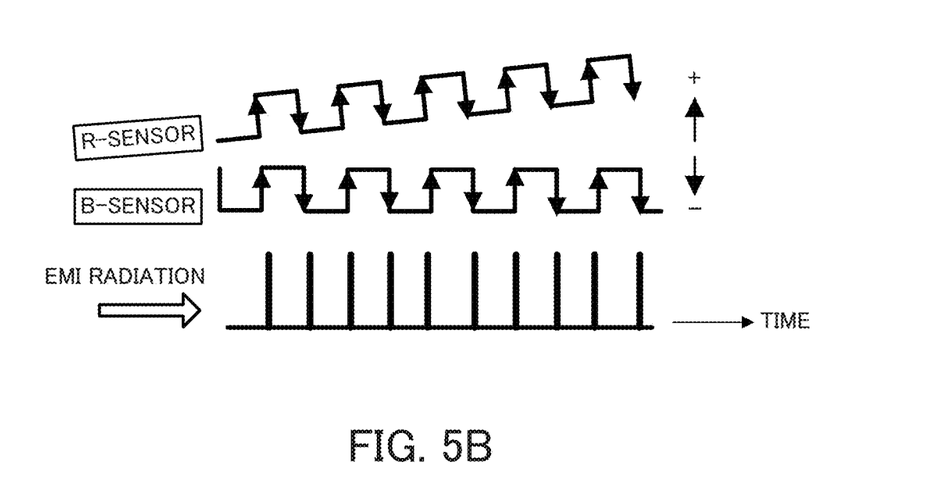

FIG. 5B shows intensity of the extraneous emission (EMI radiation) when the polarities of the synchronization signals supplied to the red and blue sensors 18 and 19 are mutually identical. Upper and middle parts of FIG. 5B respectively show the synchronization signals supplied to the red and blue sensors 18 and 19; these synchronization signals have mutually identical polarities at each time shown along a horizontal axis in the figure. A lower part of FIG. 5B shows a high intensity extraneous emission (superposed extraneous emission) caused by superposition of the extraneous emissions from the red and blue sensors 18 and 19.

On the other hand, FIG. 5A shows intensity of the extraneous emission when the polarities of the synchronization signals supplied to the red and blue sensors 18 and 19 are mutually opposite. As in FIG. 5B, upper and middle parts of FIG. 5A respectively show the synchronization signals supplied to the red and blue sensors 18 and 19; these synchronization signals have mutually opposite polarities at each time. A lower part of FIG. 5A shows that the extraneous emissions from the red and blue sensors 18 and 19 mutually approximately cancel out, which results in a significantly lower intensity extraneous emission than the high intensity extraneous emission shown in FIG. 5B.

As described above, this embodiment supplies the synchronization signals having mutually opposite polarities to the red and blue sensors 18 and 19 arranged under the arrangement conditions 1 to 3 and thereby effectively reduces the extraneous emission.

This embodiment described the case where, as shown in FIG. 5A, the polarities of the synchronization signals supplied to the red and blue sensors 18 and 19 are always mutually opposite, that is, a case where there exists no time period in which the polarities of the synchronization signals are mutually identical. However, such a relation is not necessarily needed. Although the red and blue sensors 18 and 19 are basically required to synchronously operate with each other, if there is a range where gap-of-synchronization is permitted, the polarities of the synchronization signals may be mutually identical in that range. In other words, it is only necessary that, in each period of the synchronization signals supplied to the red and blue sensors 18 and 19, a time period in which the polarities of the synchronization signals are mutually opposite be longer than a time period in which the polarities of the synchronization signals are mutually identical.

Embodiment 3

Figure 6:
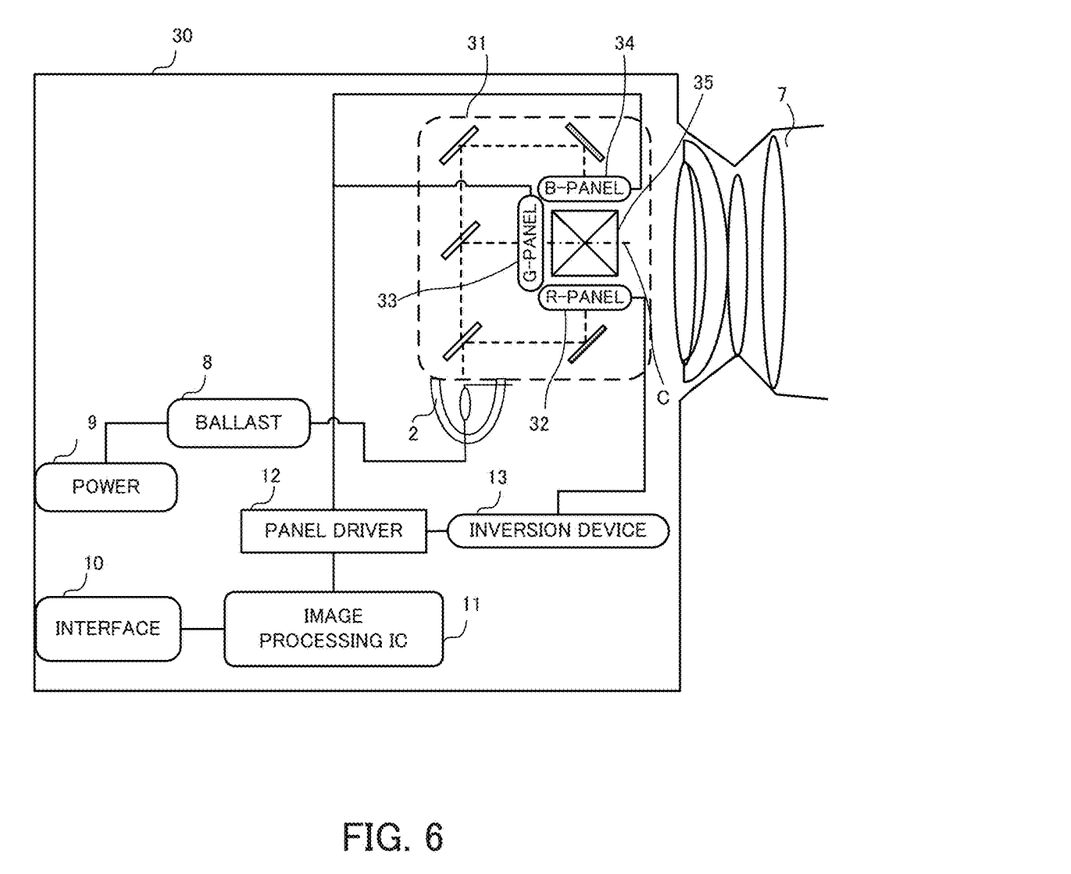
FIG. 6 is a block diagram showing a configuration of an image projection apparatus that is Embodiment 3 of the present invention.

FIG. 6 shows a configuration of an image projection apparatus 30 as an electric apparatus that is a third embodiment (Embodiment 3) of the present invention. In this embodiment, elements identical to those in Embodiment 1 (FIG. 1) are denoted by the same reference numerals as those in Embodiment 1, and description of part of the identical elements will be omitted.

First, description of an optical configuration of the image projection apparatus 30 will be made. The image projection apparatus 30 includes a color separation/combination optical system 31 using dichroic mirrors and reflective mirrors. The color separation/combination optical system 31 separates a white light from a lamp (light source) 2 into a red light (first color light), a green light (second colored light) and a blue light (third color light) and introduces these color lights respectively toward a first optical modulator 32, a second optical modulator 33 and a third optical modulator 34. As the optical modulator, any electrically driven element may be used which is capable of modulating an entering light and controlling its transmittance to produce an image light (exit light), such as a transmissive liquid crystal panel. The first optical modulator 32, the second optical modulator 33 and the third optical modulator 34 respectively correspond to a first electrically driven element, a second electrically driven element and a third electrically driven element. In the following description, the first optical modulator 32, the second optical modulator 33 and the third optical modulator 34 are respectively referred to as "a red panel 32", "a green panel 33" and "a blue panel 34".

The three color lights modulated by the red, green and blue panels 32, 33 and 34 enter a prism unit 35 as an optical element and then enters a projection optical system 7 to be project onto a projection surface (not shown) such as a screen. Thereby, a full color projected image is displayed.

Next, description of an electrical configuration of the image projection apparatus 30 will be made. Reference numeral 11 denotes an image processing IC that performs various processes on an input image signal to convert the input image signal into video data signals for red, green and blue respectively suitable for drive of the red, green and blue panels 32, 33 and 34. The video data signals from the image processing IC 11 are sent to a panel driver 12.

The panel driver 12 outputs drive signals corresponding respectively to the video data signals for red, green and blue and outputs synchronization signals for causing the red, green and blue panels 32, 33 and 34 to synchronously (or approximately synchronously) operate. The synchronization signals output (supplied) to the red panel 32, the green panel 33 and the blue panel 34 correspond respectively to a first electric signal, a second electric signal and a third electric signal whose polarities reverse periodically at mutually same periods.

The synchronization signal to the red panel 32 is input to an inversion device 13. The inversion device 13 reverses the polarity of the synchronization signal and supplies it to the red panel 32. Thereby, the polarity of the synchronization signal supplied to the red panel 32 becomes opposite to the polarities of the synchronization signals supplied to the blue and green panels 33 and 34. The polarities of the synchronization signals supplied to the blue and green panels 33 and 34 are mutually identical. The panel driver 12 and the inversion device 13 constitute a signal outputter.

Although this embodiment shows the case where the inversion device 13 is separate from the panel driver 12, the inversion device 13 may be included in the panel driver 12.

Each of the red, green and blue panels 32, 33 and 34 receiving the video data signals and the synchronization signals performs, in synchronization with the synchronization signal, a modulation operation to modulate the entering light and thereby produce the image light corresponding to the video data signal.

A setting may be made such that the green and blue panels 33 and 34 each take in the image signal at rising edges of the synchronization signal and the red panel 32 takes in the image signal at falling edges of the synchronization signal. Thereby, even when the polarities of the synchronization signals are mutually reversed, timings at which the red, green and blue panels 32, 33 and 34 take in the video data signals can be approximately synchronized.

Figure 7:
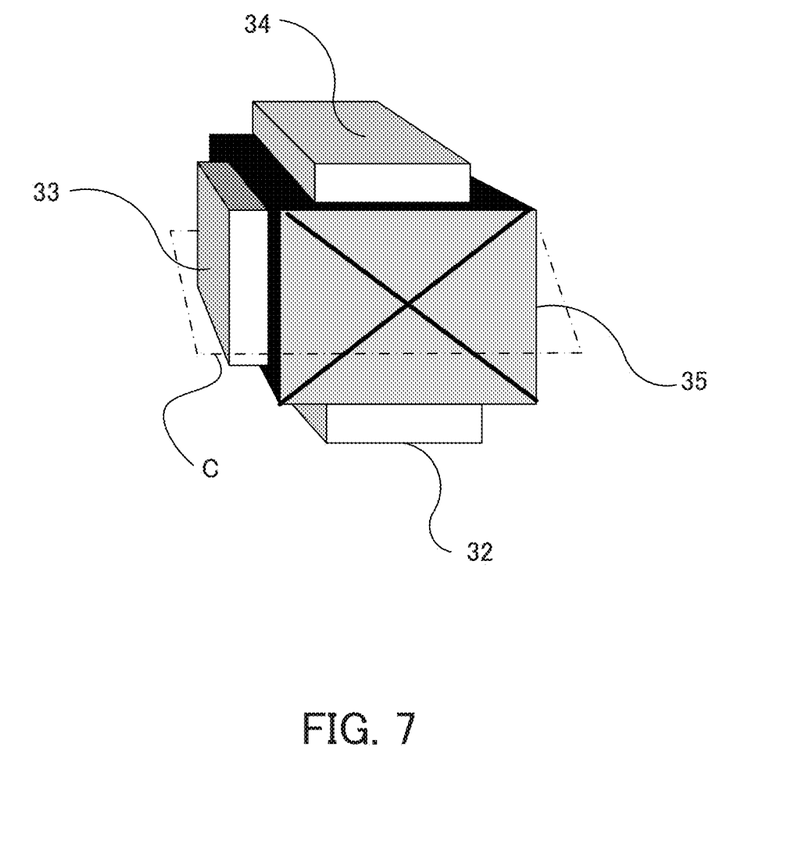
FIG. 7 shows arrangement of liquid crystal panels in the image projection apparatus of Embodiment 3.

FIG. 7 shows arrangement of the red, green and blue panels 32, 33 and 34 around the prism unit 35 shown in FIG. 6. The red and blue panels 32 and 34 are arranged on mutually opposite side across the prism unit 35. Light exit surfaces (element surfaces) of the red and blue panels 32 and 34 respectively face two light entrance surfaces (first and second entrance surfaces) provided at mutually opposite sides in the prism unit 35. This arrangement condition is hereinafter referred to as "arrangement condition 1".

Furthermore, the red and blue panels 32 and 34 are arranged such that each of their light exit surfaces faces toward the light exit surface of the other panel. This arrangement condition is hereinafter referred to as "arrangement condition 2". Moreover, the red and blue panels 32 and 34 are arranged such that their light exit surfaces face toward a same plane C from mutually opposite sides across the plane C. This arrangement condition is hereinafter referred to as "arrangement condition 3". This embodiment shows, as a representative example satisfying these arrangement conditions 1 to 3, a case where the red and blue panels 32 and 34 are arranged mutually parallel (that is, parallel to the plane C) and their light exit surfaces face toward directions facing (opposite to) each other, that is, each face toward a direction facing the plane C.

On the other hand, the green panel 33 is arranged such that its light exit surface faces a light entrance surface (third entrance surface) of the prism unit 35; the third light entrance surface faces toward a different direction from the first and second light entrance surfaces of the prism unit 35. In other words, the green panel 33 is arranged such that its light exit surface does not face toward the plane C.

The red and blue panels 32 and 34 arranged as above each generate extraneous emission due to polarity change of the synchronization signal. Directions of extraneous emission directivities from the red and blue panels 32 and 34 arranged mutually parallel are directions orthogonal to their light exit surfaces, which are directions facing each other. Therefore, if the polarities of the synchronization signals supplied to the red and blue panels 32 and 34 are always mutually identical, the extraneous emissions from the red and blue panels 32 and 34 are mutually superposed.

For this reason, this embodiment provides, as mentioned above, the inversion device 13 to mutually reverse the polarities of the synchronization signals supplied to the red and blue panels 32 and 34. Thereby, the extraneous emissions from the red and blue panels 32 and 34 mutually cancel out, which makes it possible to reduce an overall extraneous emission due to the operations of the red and blue panels 32 and 34. In particular, in this embodiment, the red and blue panels 32 and 34 are arranged mutually parallel and their light exit surfaces face toward the directions facing each other, that is, the directions of the extraneous emission directivities face each other, which increases the effect of reducing the extraneous emission FIG. 8B shows intensity of the extraneous emission (EMI radiation) when the polarities of the synchronization signals supplied to the red and blue panels 32 and 34 are mutually identical. Upper and middle parts of FIG. 8B respectively show the synchronization signals supplied to the red and blue panels 32 and 34; these synchronization signals have mutually identical polarities at each time shown along a horizontal axis in the figure. A lower part of FIG. 8B shows a high intensity extraneous emission (superposed extraneous emission) caused by superposition of the extraneous emissions from the red and blue panels 32 and 34.

Figure 8A:
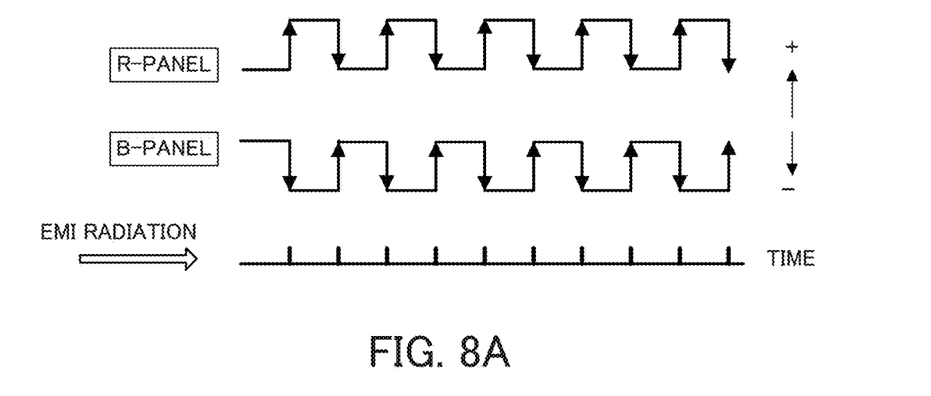
FIGS. 8A and 8B show an effect provided by Embodiment 3.
Figure 8B:
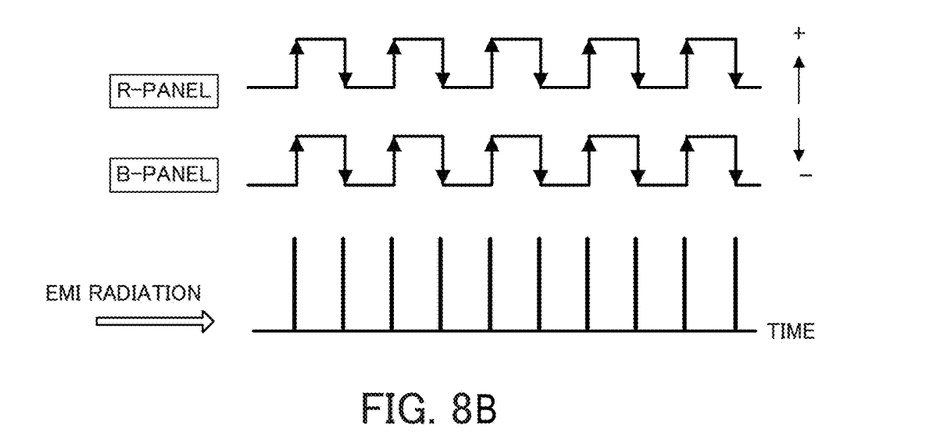

On the other hand, FIG. 8A shows intensity of the extraneous emission when the polarities of the synchronization signals supplied to the red and blue panels 32 and 34 are mutually opposite. As in FIG. 8B, upper and middle parts of FIG. 8A respectively show the synchronization signals supplied to the red and blue panels 32 and 34; these synchronization signals have mutually opposite polarities at each time. A lower part of FIG. 8A shows that the extraneous emissions from the red and blue panels 32 and 34 mutually cancel out, which results in a significantly lower intensity extraneous emission than the high intensity extraneous emission shown in FIG. 8B.

As described above, this embodiment supplies the synchronization signals having mutually opposite polarities to the red and blue panels 32 and 34 arranged under the arrangement conditions 1 to 3 and thereby effectively reduces the extraneous emission.

This embodiment described the case where, as shown in FIG. 8A, the polarities of the synchronization signals supplied to the red and blue panels 32 and 34 are always mutually opposite, that is, a case where there exists no time period in which the polarities of the synchronization signals are mutually identical. However, such a relation is not necessarily needed. Although the red and blue panels 32 and 34 are basically required to synchronously operate with each other, if there is a range where gap-of-synchronization is permitted, the polarities of the synchronization signals may be mutually identical in that range. In other words, it is only necessary that, in each period of the synchronization signals supplied to the red and blue panels 32 and 34, a time period in which the polarities of the synchronization signals are mutually opposite be longer than a time period in which the polarities of the synchronization signals are mutually identical.

In addition, although this embodiment described the case where the red and blue panels 32 and 34 are arranged parallel to each other, they may be arranged not parallel to each other as long as the arrangement thereof satisfies at least one of the arrangement conditions 1 to 3.

Although the above embodiments described the case where the electrically driven element is an optical modulator or an image sensor, other electrically driven elements than the optical modulator and the image sensor may be used which operate in response to receipt of an electric signal whose polarity reverses periodically. The other electrically driven elements include an IC, various sensors, a circuit board and the like. In this case, the element surface is a main operation surface of the electrically driven element or a surface having a largest area among surfaces of the electrically driven element.

In each of the above embodiments, the extraneous emissions from the first and second electrically driven elements arranged such that each of their element surfaces faces toward the element surface of the other electrically driven element act so as to cancel each other out in the time period in which the polarities of the first and second electric signals supplied to the first and second electrically driven elements are mutually opposite. Accordingly, each embodiment can suppress generation of a high intensity extraneous emission due to mutual superposition of the extraneous emissions from the first and second electrically driven elements.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-024473, filed on Feb. 12, 2014, and 2015-12264, filed on Jan. 26, 2015, which are hereby incorporated by reference wherein in their entirety.

What is claimed is:

1. An image projection apparatus comprising:
    a first optical modulator configured to operate in response to receipt of a first clock signal whose polarity reverses periodically so as to modulate a first color light introduced thereto;
    a second optical modulator configured to operate in response to receipt of a second clock signal whose polarity reverses periodically at a same period as that of the first clock signal so as to modulate a second color light introduced thereto;
    an optical element through which exit lights from the first and second optical modulators pass;
    a projection optical system configured to project an image light including the exit lights modulated by the first and second optical modulators onto a projection surface; and
    a signal outputter configured to output the first and second clock signals respectively to the first and second optical modulators,
    wherein:
    the first and second optical modulators are arranged on mutually opposite sides across the optical element,
    light exit surfaces of the first and second optical modulators respectively face first and second light entrance surfaces provided in the optical element at mutually opposite sides thereof, and the signal outputter is configured to output the first and second clock signals such that, in each period of the first and second clock signals, a time period in which their polarities are mutually reversed is longer than a time period in which their polarities are mutually identical.

2. The image projection apparatus according to claim 1, wherein
the signal outputter is configured to output the first and second clock signals such that their polarities are mutually different.

3. The image projection apparatus according to claim 1, wherein
the first optical modulator is configured to emit extraneous emission due to the first clock signal,
the second optical modulator is configured to emit extraneous emission due to the second clock signal.

4. The image projection apparatus according to claim 1, wherein the signal outputter is configured to output the first and second clock signals such that, in each period of the first and second clock signals, the time period in which their polarities are mutually reversed is longer than the time period in which their polarities are mutually identical, thereby causing extraneous emissions from the first and second optical modulators to cancel each other out and lower an intensity of an extraneous emission from the image projection apparatus.

5. The image projection apparatus according to claim 1, further comprising:
a third optical modulator configured to operate in response to receipt of a third clock signal whose polarity reverses periodically at a same period as those of the first and second clock signals so as to modulate a third color light introduced thereto, wherein:
exit light from the third optical modulator passes through the optical element,
the projection optical system is configured to project the image light including the exit lights modulated by the first, second and third optical modulators onto the projection surface,
the signal outputter is configured to output the first, second and third clock signals respectively to the first, second and third optical modulators, and
a light exit surface of the third optical modulator faces a third light entrance surface provided in the optical element, the third light entrance surface facing toward a different direction from the first and second light entrance surfaces.

6. The image projection apparatus according to claim 5, wherein
the signal outputter is configured to output the third clock signal whose polarity is identical to that of the first or second clock signal.

7. The image projection apparatus according to claim 5, wherein:
the first optical modulator is configured to operate in response to receipt of the first clock signal whose polarity reverses periodically so as to modulate the first color light introduced thereto, thereby producing an image light corresponding to a first video data signal,
the second optical modulator is configured to operate in response to receipt of the second clock signal whose polarity reverses periodically at the same period as that of the first clock signal so as to modulate the second color light introduced thereto, thereby producing an image light corresponding to a second video data signal,
the third optical modulator is configured to operate in response to receipt of the third clock signal whose polarity reverses periodically at the same period as those of the first and second clock signals so as to modulate the third color light introduced thereto, thereby producing an image light corresponding to a third video data signal,
the produced image lights from the first, second and third optical modulators are configured to pass through the optical element,
the projection optical system is configured to project the image light corresponding to the produced image lights having passed through the optical element onto the projection surface, and
the signal outputter is configured to output first, second and third drive signals respectively to the first, second and third optical modulators and to output the first, second and third clock signals respectively to the first, second and third optical modulators, the first, second and third drive signals respectively corresponding to the first, second and third video data signals.

* * * * *